(12) United States Patent
Zheng et al.

(10) Patent No.: US 9,020,227 B2
(45) Date of Patent: Apr. 28, 2015

(54) AUTOMATIC INTERATRIAL SEPTUM DETECTION FROM PRE-OPERATIVE AND INTRA-OPERATIVE 3D MEDICAL IMAGES FOR ACCURATE TRANSSEPTAL PUNCTURE

(71) Applicants: Yefeng Zheng, Dayton, NJ (US); Matthias John, Nuremberg (DE)

(72) Inventors: Yefeng Zheng, Dayton, NJ (US); Matthias John, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 218 days.

(21) Appl. No.: 13/916,985

(22) Filed: Jun. 13, 2013

(65) Prior Publication Data
US 2014/0369576 A1 Dec. 18, 2014

(51) Int. Cl.
G06K 9/00 (2006.01)
G06K 9/62 (2006.01)
G06T 7/00 (2006.01)

(52) U.S. Cl.
CPC ............ *G06K 9/6256* (2013.01); *G06T 7/0051* (2013.01); *G06T 7/0012* (2013.01)

(58) Field of Classification Search
CPC ... G06K 9/6256; G06T 7/0012; G06T 7/0051
USPC .......................................... 382/100, 128–132
See application file for complete search history.

(56) References Cited

U.S. PATENT DOCUMENTS

2012/0271341 A1* 10/2012 Hill et al. ...................... 606/200
2013/0282059 A1* 10/2013 Ketai et al. .................... 606/232

* cited by examiner

Primary Examiner — Shefali Goradia

(57) ABSTRACT

A computer-implemented method of determining an interatrial septum ring in a cardiac image includes determining a left atrium mean shape based on a plurality of training images and determining an interatrial septum ring mean shape based on the left atrium mean shape. A left atrium mesh is identified in a new image. Then, a deformation field from the left atrium mean shape to the left atrium mesh is calculated and applied to the interatrial septum ring mean shape to determine the interatrial septum ring in the new image.

21 Claims, 7 Drawing Sheets

AUTOMATIC INTERATRIAL SEPTUM DETECTION FROM PRE-OPERATIVE AND INTRA-OPERATIVE 3D MEDICAL IMAGES FOR ACCURATE TRANSSEPTAL PUNCTURE

TECHNOLOGY FIELD

The present invention relates generally to methods, systems, and apparatuses which detect the interatrial septum in pre-operative and intra-operative 3D medical images. These methods, systems, and apparatuses may be applied to increase the accuracy of transseptal puncture during surgical procedures such as left heart catheterization.

BACKGROUND

Transseptal puncture ("TP") of the interatrial septum is a technique utilized to access the left atrium during surgical procedures. TP is involved in many left heart trans-catheter interventions including left atrial fibrillation ablation, left atrial appendage occlusion, mitral valve valvuloplasty, and mitral valve repair using clips. Although the procedure has been used since 1959, it remains a difficult procedure for physicians to perform, especially for patients with an atypical anatomy or a small fossa ovalis.

Typically, physicians utilize fluoroscopy during a TP procedure and rely on anatomical landmarks with high attenuation (e.g., spine and ribs) to localize the interatrial septum. Catheters in the aortic root, the coronary sinus, and other anatomical structures may provide additional visual guidance. However, because fluoroscopy is a 2D imaging modality without depth information, it is difficult to estimate the 3D location of the interatrial septum without using multiple fluoroscopic views to verify the location.

If physicians cannot accurately locate the interatrial septum during a TP procedure, various complications may occur. A puncture outside the interatrial septum may result in severe complications, such as aortic puncture, cardiac perforation, and systemic embolization. Moreover, a puncture inside the interatrial septum is not guaranteed to be appropriate for a certain intervention.

C-arm computed tomography (CT) has emerged as an effective technique for providing a 3D cardiac model for use during surgical procedures. One of the advantages of C-arm CT over other imaging systems, e.g., conventional CT or magnetic resonance imaging (MRI), is that C, arm CT is able to capture both a 3D patient-specific cardiac model and a 2D fluoroscopic image with the same device. However, the use of C-arm CT imaging data for interatrial septum estimation present some challenges. There may be severe cardiac motion artifacts as well as streak artifacts caused by various catheters inserted in the heart. In addition, in many cardiac treatments, the contrast injection is only inside the left atrium, while the right atrium has no contrast at all. Thus, the interatrial septum wall is often not visible and it is very difficult, if not impossible, to accurately delineate the boundary of the interatrial septum wall.

SUMMARY

Embodiments of the present invention address and overcome one or more of the above shortcomings and drawbacks, by providing methods, systems, and apparatuses for determining an interatrial septum ring in an image. This technology is particularly well-suited for, but by no means limited to, identifying interatrial septum rings in images captured by C-arm CT imaging devices where it is difficult to delineate the boundary of the interatrial septum wall. For the example of surgical techniques such as TP, using the techniques and systems described herein medical personnel may accurately locate the interatrial septum during procedure thus reducing the risk of complications such as aortic puncture, cardiac perforation, and systemic embolization.

Some embodiments of the present invention are directed to a method of determining an interatrial septum ring in cardiac image where a left atrium mean shape based on a plurality of training images and an interatrial septum ring mean shape based on the left atrium mean shape. A left atrium mesh is identified in a new image and a deformation field from the left atrium mean shape to the left atrium mesh is calculated. The deformation field is applied to the interatrial septum ring mean shape to determine the interatrial septum ring in the new image. In some embodiments, the deformation field is calculated using a thin plate spline model. A representation of the determined interatrial septum ring and the new image may be presented on a display.

According to one aspect of the invention the left atrium mean shape is determined by identifying a first left atrium shape in a first training image included in the plurality of training images, identifying a plurality of second left atrium shapes in a plurality of second training images included in the plurality of training images, applying a geometric transformation to each of the plurality of second left atrium shapes to align each second left atrium shape with the first left atrium shape, and determining the mean left atrium shape based on the first left atrium shape and the plurality of aligned second left atrium shapes.

According to another aspect of the invention, the mean left atrium shape is determined by identifying a plurality of first points corresponding to the first left atrium shape, identifying a plurality of second points corresponding to the second left atrium shape, and calculating an average of the plurality of first points and the plurality of second points to determine the mean left atrium shape.

In some embodiments of the present invention a plurality of neighboring points on the left atrium mesh corresponding to a predicted location of a interatrial septum ring are identified and the deformation field from the left atrium mean shape to the left atrium mesh is calculated based on these neighboring points.

According to one aspect of the present invention, a plurality of points corresponding to the determined interatrial septum ring is identified. A projected position for each of the plurality of points is determined and each of the plurality of points is adjusted by its corresponding projected position. In some embodiments the projected position of a respective point corresponds to a position on the left atrium mesh that is closest in distance from the respective point.

Some embodiments of the present invention are directed at a method of determining an interatrial septum ring in a cardiac image which is dependent on whether a boundary associated with an interatrial septum wall is visible in an image. If the boundary is visible, an initial estimate of the interatrial septum wall included in the image is determined. Then, discriminative shape model is applied to the initial estimate of the interatrial septum wall to determine the interatrial septum ring in the image. If the boundary associated with an interatrial septum wall is not visible in an image a left atrium mean shape is determined based on a plurality of training images and an interatrial septum ring mean shape is determined based on the left atrium mean shape. A left atrium mesh is identified in the image. Then, a deformation field from the left atrium mean shape to the left atrium mesh is calculated and applied the interatrial septum ring mean shape to determine the interatrial septum ring in the image.

Some embodiments of the present invention are directed at a system for determining an interatrial septum ring in a cardiac image. The system includes a database configured to store a plurality of training images and a receiver operably coupled to an imaging device and configured to receive a new image from the imaging device. The system also includes a processor configured to determine a left atrium mean shape based on the plurality of training images, determine an interatrial septum ring mean shape based on the left atrium mean shape, identify a left atrium mesh in the new image, calculate a deformation field from the left atrium mean shape to the left atrium mesh, and apply the deformation field to the interatrial septum ring mean shape to determine the location of the interatrial septum ring in the new image. In some embodiments, the system also includes a display configured to present a representation of the determined interatrial septum ring and the new image.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The following disclosure describes the present invention according to several embodiments directed at automatically detecting the interatrial septum in preoperative and intraoperative 3D medical images. The techniques described herein may be applied to increase the accuracy of transseptal puncture during left heart catheterization. However, one skilled in the art would recognize that the techniques may also be applicable to other surgical and non-surgical scenarios where accurate detection of the interatrial septum is required.

Figure 1:
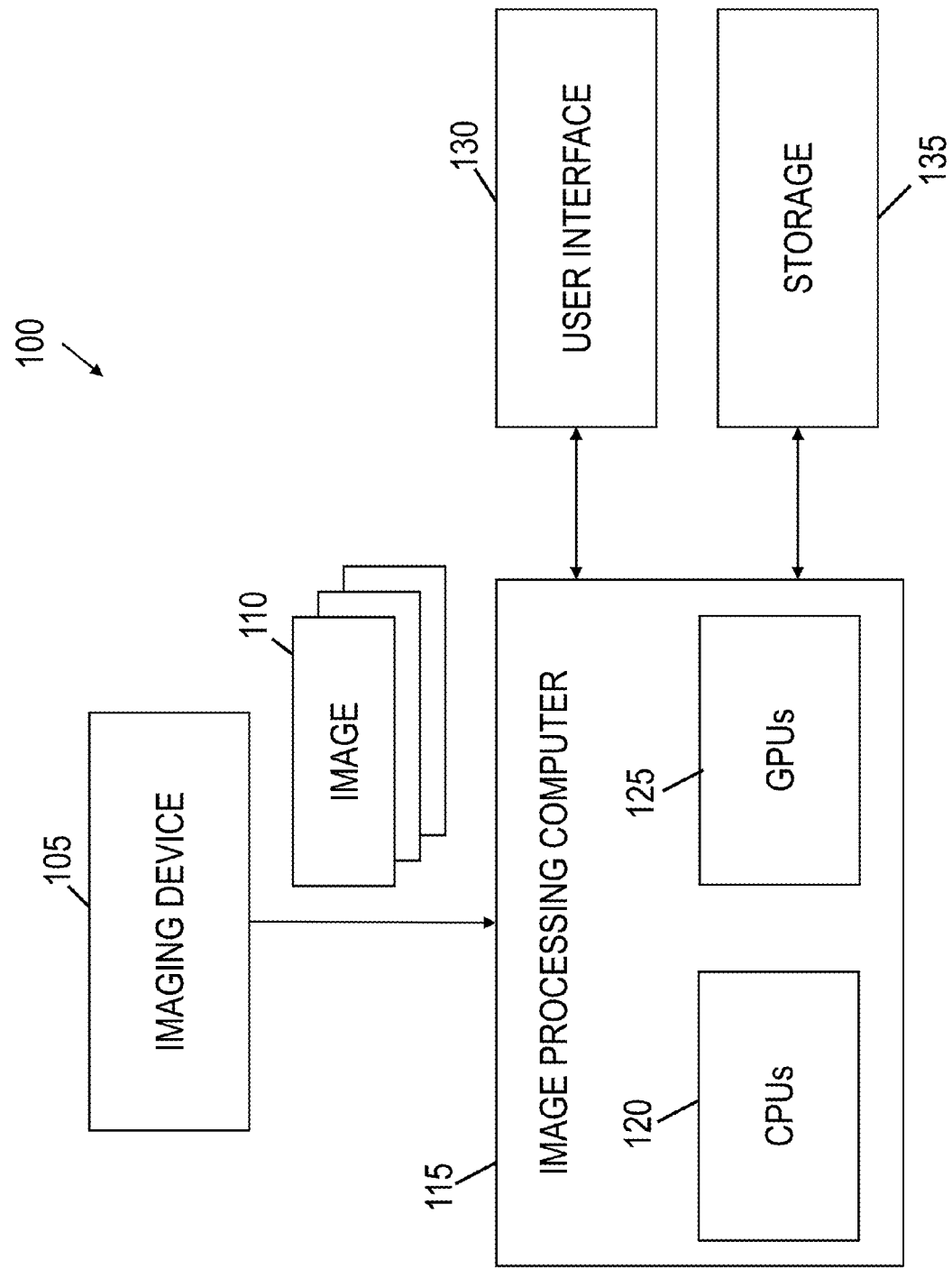
FIG. 1 is a perspective view of an imaging system according to some embodiments of the present invention.

FIG. 1 is a perspective view of an imaging system 100 according to some embodiments of the present invention. An imaging device 105 transfers one or more images 110 to an imaging computer 115. In one embodiment, the imaging device 105 is a C-Arm/device (including an X-ray source and an image intensifier) and the images 110 are fluoroscopic images. In the example of FIG. 1, the imaging computer 115 includes one or more central processing units (CPUs) 120 and one or more graphics processing units (GPUs) 125. As is well understood in the art, the use of CPUs in combination with GPUs provides various computation advantages in engineering applications, including a decreased latency in executing computationally intense algorithms. The imaging device 105 and the imaging computer 115 may be connected directly or indirectly using any technique known in the art. Thus, for example, in some embodiments the imaging device 105 and the imaging computer 115 are directly connected using a proprietary cable or an industry standard cable such as a Universal Serial Bus (USB) cable. In other embodiments, the imaging device 105 and the imaging computer 115 are indirectly connected over one or more networks (not shown in FIG. 1). These networks may be wired, wireless or a combination thereof.

Continuing with reference to FIG. 1, a user interface 130 is connected directly or indirectly to the imaging computer 115. The user interface 130 may include any interface known in the art including, for example and without limitation, a display, a keyboard, a mouse, and/or a touchscreen. Storage 135 is also connected, either directly or indirectly, to the imaging computer 115. In some embodiments, the imaging computer 115 may communicate with the storage 135 to retrieve images (not shown in FIG. 1) as an alternative to receiving images 110 from the imaging device 105. Storage 135 may be implemented using any technique known in the art and may utilize, for example, any combination of magnetic, semi-conductor, and optical storage media.

Figure 2:
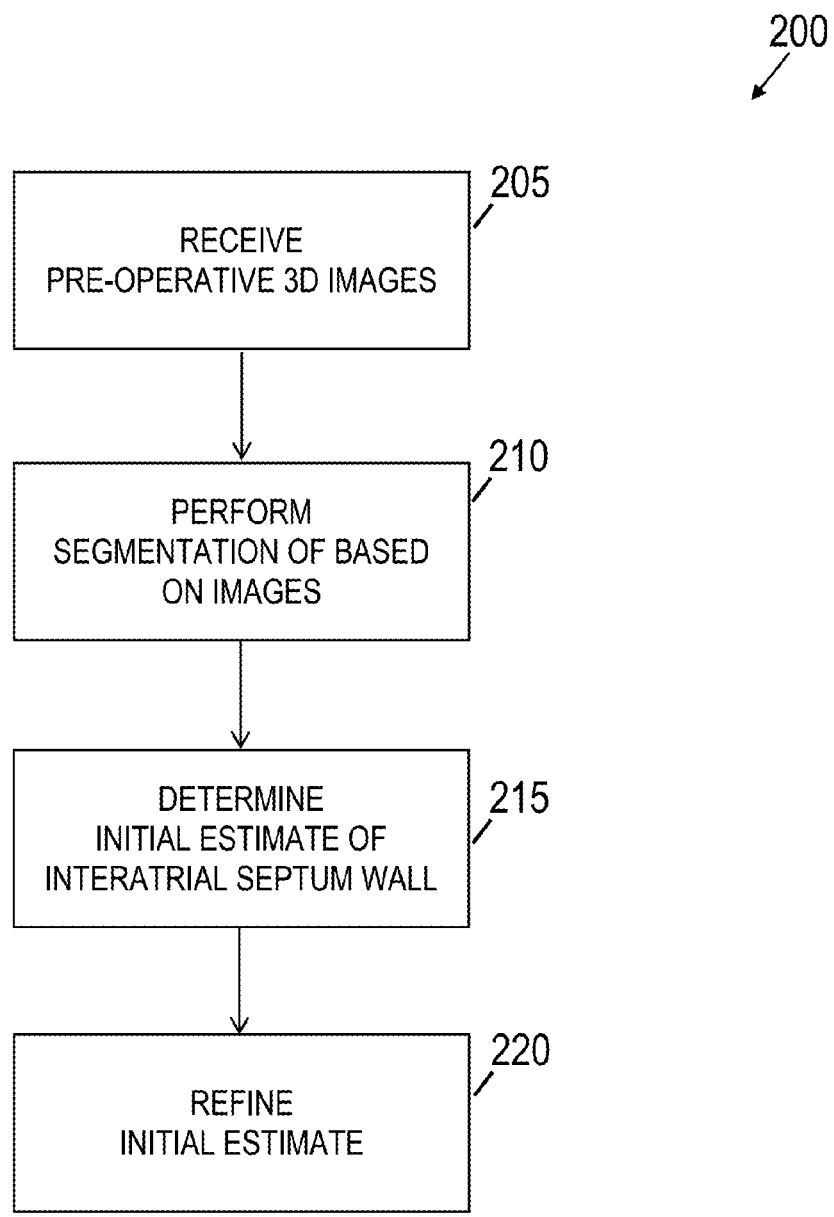
FIG. 2 illustrates a process for interatrial septum detection in images according to some embodiments of the present invention.

FIG. 2 illustrates a process 200 for interatrial septum detection according to some embodiments of the present invention. This process 200 is applicable to scenarios where the interatrial septum is visible in an image. For example, the process 200 may be used for images originating from computed tomography ("CT") or magnetic resonance imaging ("MRI") scanning procedures. At 205, images are received at the imaging computer 115, for example from imaging device 105 or storage 135. Next, at 210 a segmentation procedure is performed to segment the left and right atria. In one embodiment, this segmentation procedure includes two steps. First, the object pose is estimated to generate an initial shape. Second, the boundary of each segment is delineated under the guidance of a prior shape constraint and image boundary evidence. In some embodiments, a machine learning based method, such as marginal space learning ("MSL") may be used to segment the heart into four-chambers. Once the atria have been segmented, at 215 an initial estimate of the interatrial septum wall is determined by identifying a surface patch on the left atrium that is closest to the right atrium. Alternatively, in some embodiments, at 215 the initial estimate of the interatrial septum wall is determined by identifying a surface patch on the right atrium mesh.

It should be noted that the segmentation process is only required to provide the initial estimate of the interatrial septum wall. Thus, the procedure 200 illustrated in FIG. 2 may be performed without the segmentation step 210 if the initial estimate of the interatrial septum wall may be determined directly. For example, in some embodiments, the position, orientation, and size of the interatrial septum wall is directly estimated using MSL, without performing the segmentation described above with reference to step 210.

Continuing with reference to FIG. 2, after getting the initial estimate of the interatrial septum wall at 215, the estimate is refined at 220 using a trained statistical model. In one embodiment, a discriminative active shape model is used to refine the estimate. The use of MSL for heart segmentation and the use of a discriminative active shape models are described in greater detail in U.S. Pat. No. 7,916,919, issued Mar. 29, 2011, and entitled "System and Method for Segmenting Chambers of a Heart in a Three Dimensional Image," which is incorporated herein by reference in its entirety.

Figure 3:
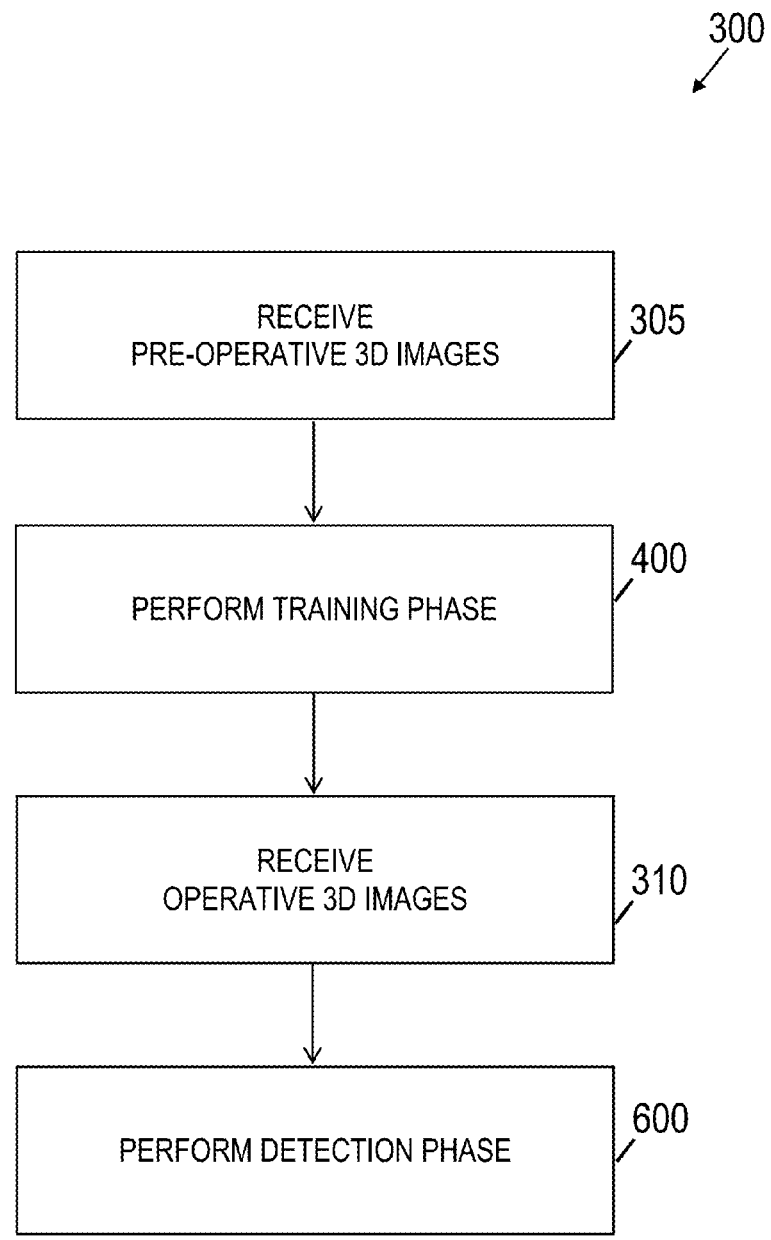
FIG. 3 illustrates an alternative process for interatrial septum detection in images according to some embodiments of the present invention.

FIG. 3 illustrates a process 300 for interatrial septum detection according to some embodiments of the present invention. This process 300 is applicable to scenarios where the interatrial septum is not visible or is otherwise difficult to delineate in image data. In some embodiments, the image is evaluated to determine whether the interatrial septum is visible. If it is visible the process 200 of FIG. 2 may be used for detection. However, if it is not visible, the process 300 of FIG. 3 may be used. The visibility determination may be made manually by medical personnel or it may be made automatically by the system 100.

Continuing with reference to FIG. 3, at 305, pre-operative 3D image data is received. In some embodiments this imaging data is captured live from an imaging device (e.g., imaging device 105 of FIG. 1), while in other embodiments the data previously captured from an imaging device is retrieved from storage (e.g., storage 135 of FIG. 1). Next, at 310, a training procedure 400 is performed based on the data received at 305. The training procedure 400 is described in greater detail below with respect to FIG. 4. Then, new 3D images are received at 315, for example, during a medical procedure. A detection procedure 600 is then performed on these new images. The detection procedure 600 is described in greater detail below with respect to FIG. 6.

Figure 4:
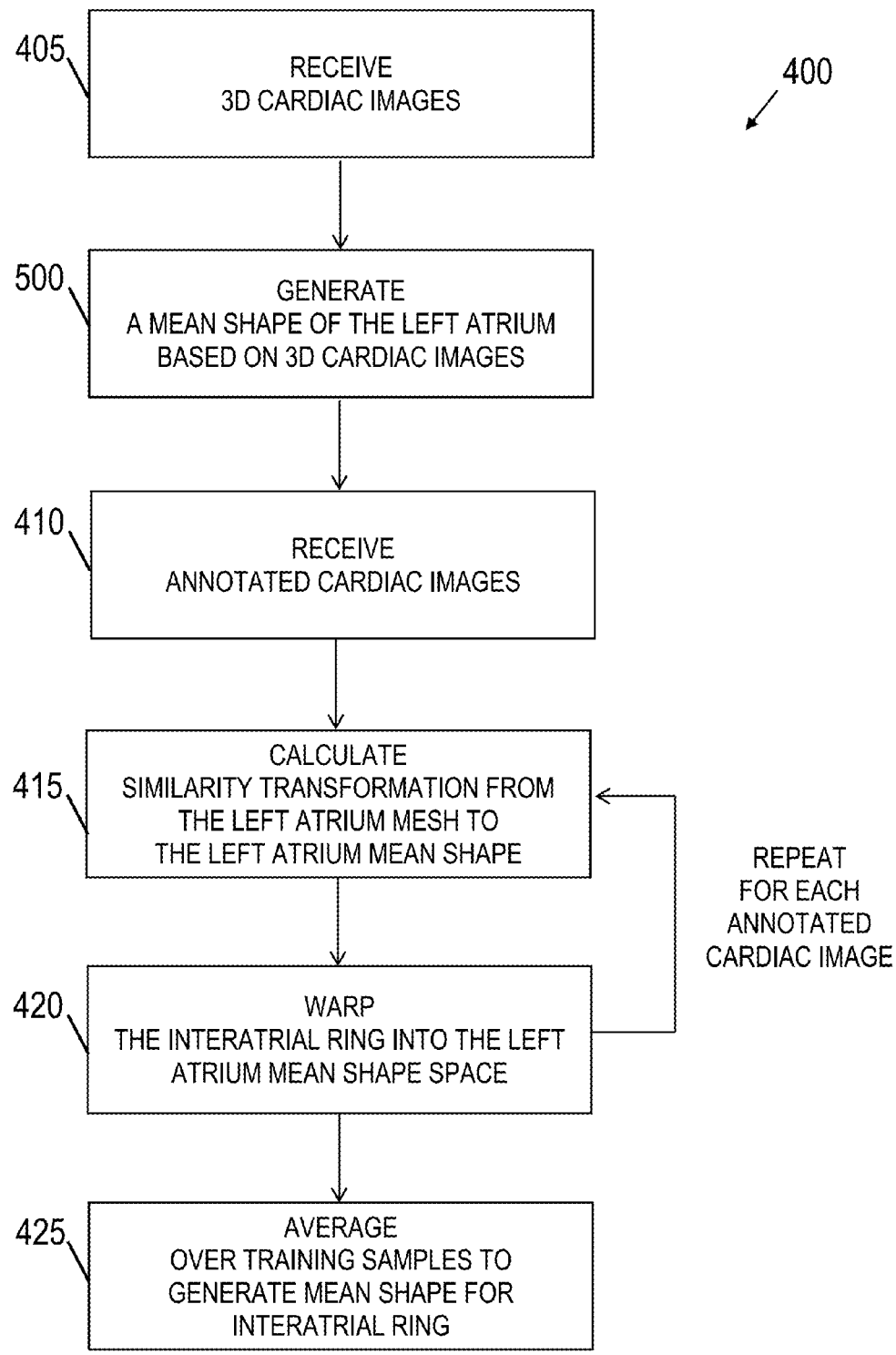
FIG. 4 provides an overview the procedure performed during the training phase according to one embodiment of the present invention.
Figure 5:
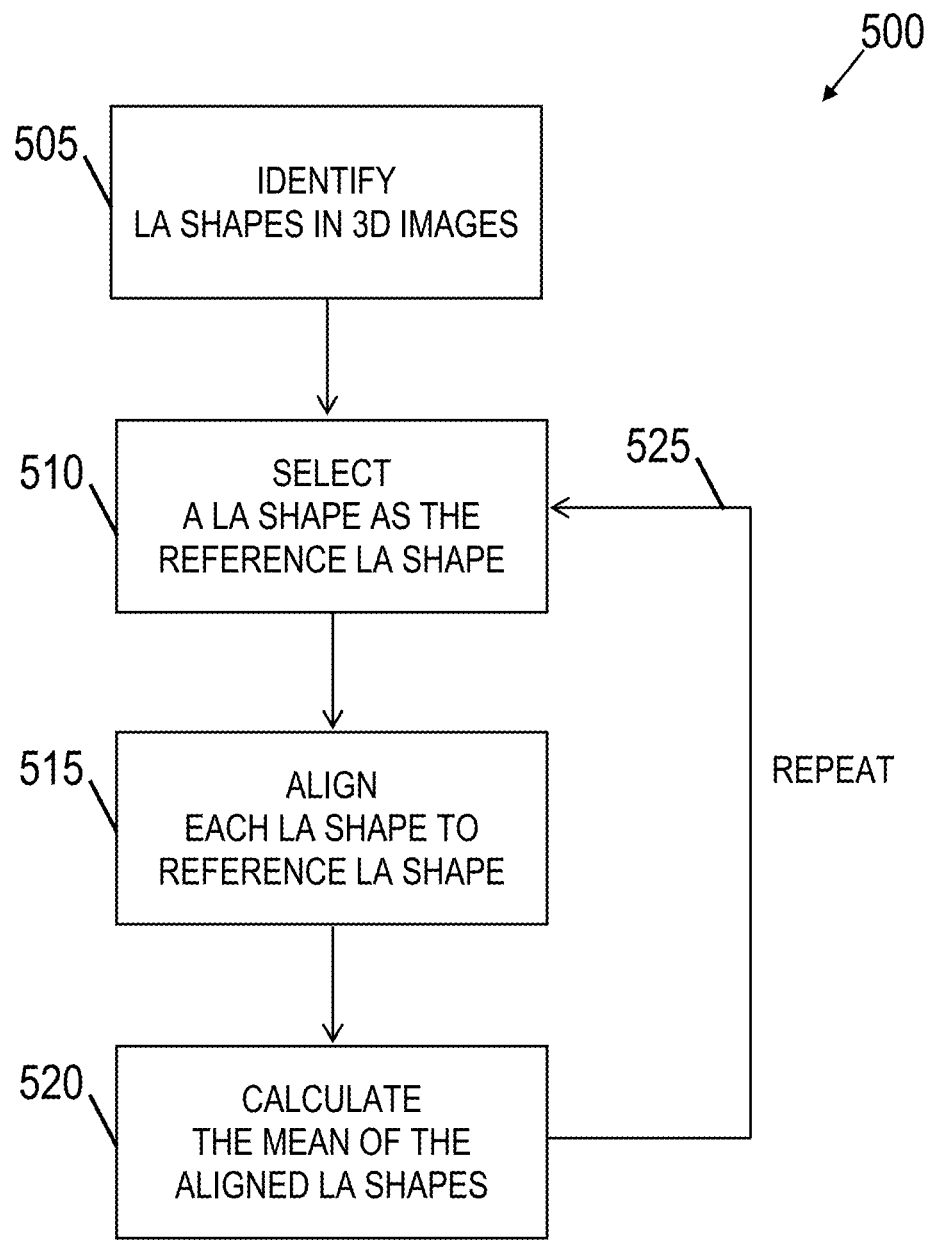
FIG. 5 illustrates an iterative technique for generating the mean shape of the left atrium, according to some embodiments of the present invention.

FIG. 4 provides an overview the procedure 400 performed during the training phase according to one embodiment of the present invention. At 405, 3D cardiac images associated with an individual are received, for example from imaging device 105 of FIG. 1. In some embodiments, these images are captured by scanning the individual with the imaging device prior to a medical operation (i.e., "pre-operative" images), while in other embodiments, the images are captured by scanning the individual during the operation (i.e., "intra-operative" images). Next at 500, the mean shape of the left atrium is generated based on the 3D cardiac images. While any technique known in the art may be used for generating the mean shape of the left atrium, an example procedure is illustrated in FIG. 5 and described in greater detail below. At 410, a group of annotated 3D cardiac images (e.g., CT images) is received, for example, from storage 135 in FIG. 1. Each of these images includes an annotated left atrium mesh and an annotated interatrial septum. Then, at 415 and 420 an iterative process is performed for each annotated cardiac image. At 415, a similarity transformation is calculated from the left atrium mesh of the annotated cardiac image to the mean shape of the left atrium. The interatrial septum ring as represented in the annotated cardiac image is then warped into the left atrium mean shape space at 420. The term "warp," as used herein, refers to the mapping image pixels or voxels from one set of coordinates to another. Once the warping process has been repeated for each annotated cardiac images, a mean shape for the interatrial septum ring is determined at 425. In some embodiments, the mean shape of the interatrial septum ring is determined by averaging over all warped interatrial septum rings as determined in 420.

In some embodiments of the present invention, Procrustes analysis is used to calculate a mean shape for the left atrium. As is well understood in the art, Procrustes analysis is a technique for removing the translation, rotation, and scaling between two shapes $M_1$ and $M_2$. For example, using this analysis, two shapes can be aligned by minimizing the formula $\|T(M_1)-M_2\|^2$, where T represents the similarity transformation between the two shapes. Thus, Procrustes analysis can be represented generally by the following formula:

$$\hat{\mathcal{T}} = \underset{\mathcal{T}}{\mathrm{argmin}} \|\mathcal{T}(M_1) - M_2\|^2$$

The similarity transformation T between $M_1$ and $M_2$ includes scaling s, rotation R, and translation T and may be represented by the following formula:

$$M_2 = sRM_1 + T$$

Accordingly, the solution to a Procrustes problem may be determined by finding values for s, R, and T, that minimize the differences between two shapes $M_1$ and $M_2$, as shown by the following formula:

$$\hat{T}, \hat{R}, \hat{s} = \underset{T,R,s}{\mathrm{argmin}} \|(sRM_1 + T) - M_2\|^2 =$$

$$\underset{T,R,s}{\mathrm{argmin}} \sum_{j=1}^{J} \left\| R \begin{bmatrix} sM_1^j(x) \\ sM_1^j(y) \\ sM_1^j(z) \end{bmatrix} + T - \begin{bmatrix} sM_2^j(x) \\ sM_2^j(y) \\ sM_2^j(z) \end{bmatrix} \right\|^2$$

Any technique known in the art can be used to estimate the similarity transformation. In some embodiments, closed-form solutions based on the singular value decomposition of a covariance matrix of the data are used.

Procrustes analysis may be extended to find an optimal shape $\overline{m}$ to represent a population of shapes $M_1, M_2 \ldots M_N$. The procedure is generally referred to a "generalized Procrustes analysis" and may be represented by the following formula:

$$\overline{m} = \underset{m}{\mathrm{argmin}} \sum_{i=1}^{N} \|\mathcal{T}_i(m) - M_i\|^2$$

The optimal shape $\overline{m}$ is also referred to herein as the mean shape. $T_i$ is the corresponding transformation from mean shape $\overline{m}$ to each individual shape $M_1$.

FIG. 5 illustrates an iterative technique 500 for generating the mean shape of the left atrium, according to some embodiments of the present invention. At 505, a group of LA shapes are identified in pre-operative or intra-operative cardiac images received, for example, from imaging device 105 in FIG. 1. Next, at 510 a reference LA shape is selected from the identified LA shapes. In some embodiments the initial LA reference shape is randomly selected from the identified LA shapes, while in other embodiments the first LA shape identified is used as the initial reference LA shape. At 515 each of the identified LA shapes is aligned to the current reference LA shape. Then, at 520, the mean of the aligned LA shapes is calculated as a new reference LA shape. In some embodiments, the mean of the aligned LA shapes is an average of the corresponding points of each shape. In order to reduce the randomness introduced by the initially selected reference LA shape, steps 510, 515, and 520 may be repeated one or more times as shown by arrow 525 in FIG. 5.

Figure 6:
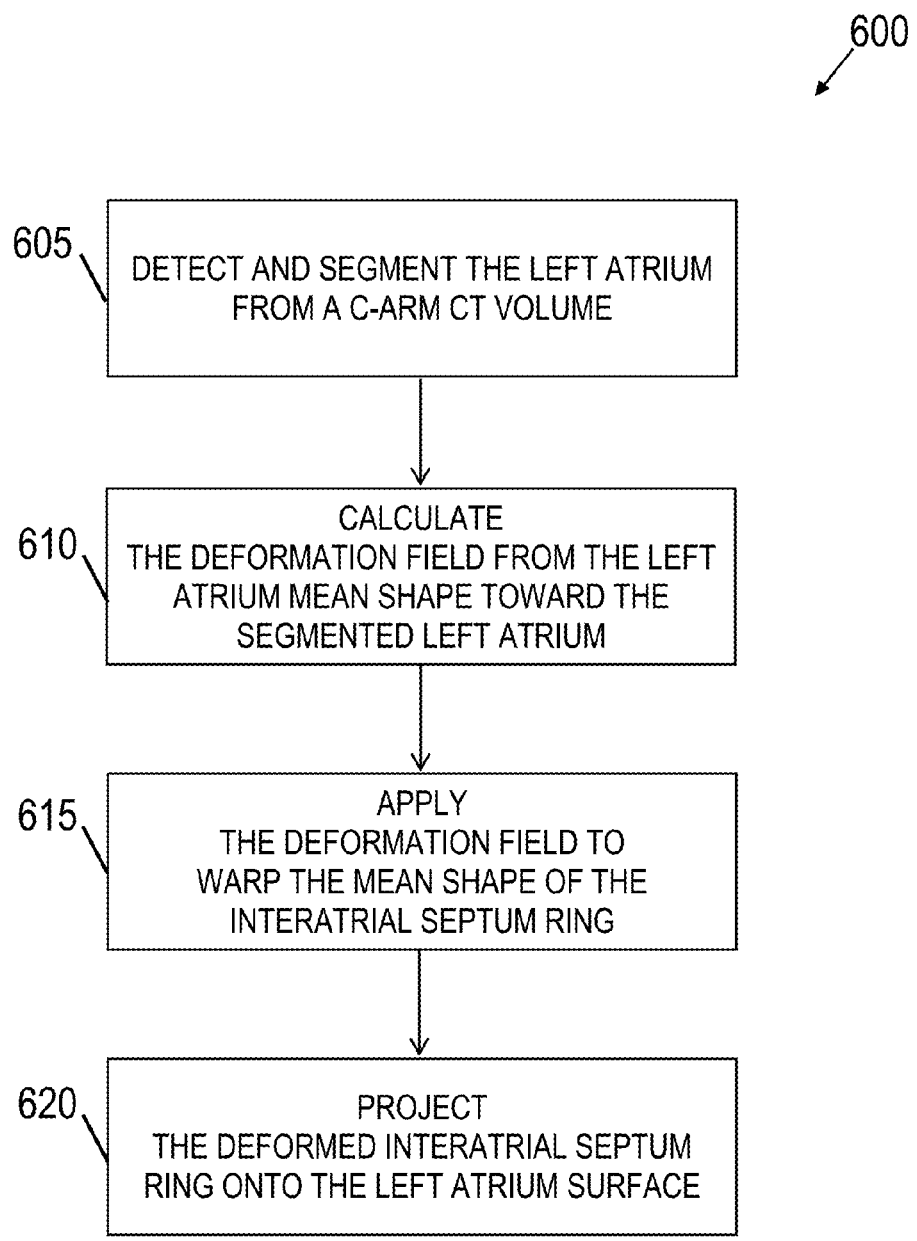
FIG. 6 is an illustration of a detection process used in some embodiments of the present invention.

FIG. 6 is an illustration of a detection process 600 used in some embodiments of the present invention. At 605, the left atrium is detected and segmented from a C-arm CT volume. In some embodiments, a model based approach is used to perform the detection and segmentation. Model-based segmentation is discussed in greater detail in U.S. Patent Application Publication No. 2012/0230570, published Sep. 13, 2012, and entitled "Method and System for Multi-Part Left Atrium Segmentation in C-Arm Computed Tomography Volumes Using Shape Constraints," which is incorporated herein by reference in its entirety.

Continuing with reference to FIG. 6, at 610, the deformation field from the left atrium mean shape toward the segmented left atrium is determined. Any deformation technique known in the art may be used to determine the field in 610. In some embodiments, the deformation field is determined using a thin-plate-spline ("TPS") model. As is well understood in the art, TPS is a coordinate interpolation approach that fits a mapping function $f(z)$ between corresponding point-sets $\{x_i\}$ and $\{y_i\}$ by minimizing the following energy function:

$$E = \sum_{i=1}^{k} \|f(x_i) - y_i\|^2 + \lambda \int\int_{R^2} \left[\left(\frac{\partial^2 z}{\partial x^2}\right)^2 + 2\left(\frac{\partial^2 z}{\partial x \partial y}\right)^2 + \left(\frac{\partial^2 z}{\partial y^2}\right)^2\right] dx\, dy$$

The point-sets $\{x_i\}$ and $\{y_i\}$ are referred to as "anchor points." In the equation for E, the first term is the interpolation error of the anchor points and the second term is the bending energy of the transformation of a "thin plate." The parameter $\lambda$ may be adjusted to control the balance between the mapping of anchor points and the rigidness of deformation. The estimated TPS deformation field is then applied to warp the mean shape of the interatrial septum ring (e.g., as determined by process 400 in FIG. 4) to the input data.

In some embodiments, the computational complexity of the TPS deformation estimate may be decreased by reducing the number of anchor points used in the estimate. For example, since an interatrial septum is on a specific side of the left atrium mesh, its deformation field is well defined by the neighboring mesh points. Thus, the complexity of the calculation may be reduced, without sacrificing the accuracy of the estimate, by selecting a small number of neighboring mesh points as the TPS anchor points for the interatrial septum ring.

Continuing with reference to FIG. 6, at 620 the deformed septum ring is projected onto the left atrium surface. For each septum ring point, the closest point on the left atrium mesh is selected as the projected position for that septum point. It should be noted that the closest point is not necessary to be a vertex of the left atrium mesh. For example, in most cases, it is not on a vertex, but a point inside a mesh triangle.

Figure 7:
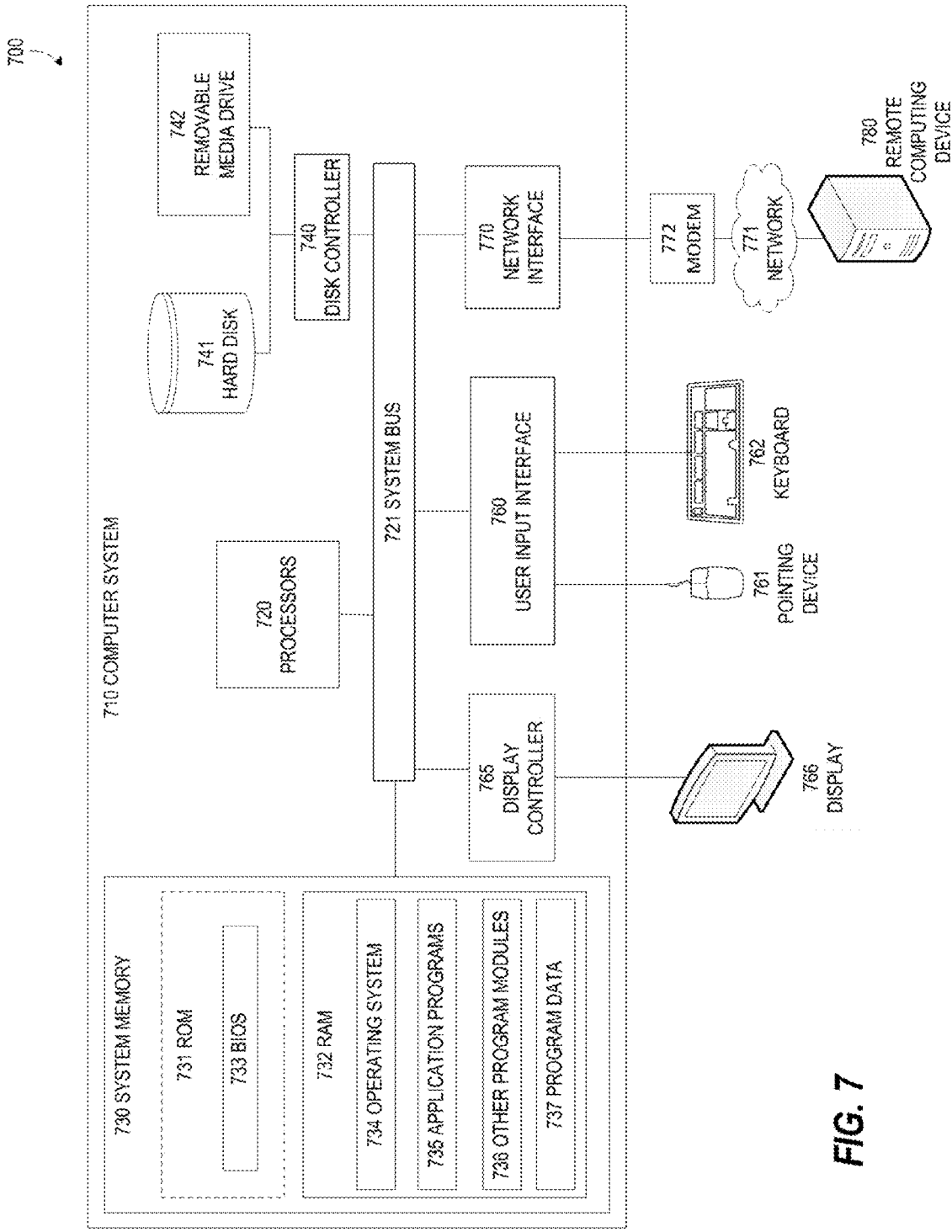
FIG. 7 illustrates an example of a computing environment within which embodiments of the invention may be implemented.

FIG. 7 illustrates an example of a computing environment 700 within which embodiments of the invention may be implemented. Computing environment 700 may include computer system 710, which is one example of a general purpose computing system upon which embodiments of the invention may be implemented. Computers and computing environments, such as computer 710 and computing environment 700, are known to those of skill in the art and thus are described briefly here.

As shown in FIG. 7, the computer system 710 may include a communication mechanism such as a bus 721 or other communication mechanism for communicating information within the computer system 710. The system 710 further includes one or more processors 720 coupled with the bus 721 for processing the information. The processors 720 may include one or more central processing units (CPUs), graphics processing units (GPUs), or any other processor known in the art.

The computer system 710 also includes a system memory 730 coupled to the bus 721 for storing information and instructions to be executed by processors 720. The system memory 730 may include computer readable storage media in the form of volatile and/or nonvolatile memory, such as read only memory (ROM) 731 and/or random access memory (RAM) 732. The system memory RAM 732 may include other dynamic storage device(s) (e.g., dynamic RAM, static RAM, and synchronous DRAM). The system memory ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system 733 (BIOS) containing the basic routines that help to transfer information between elements within computer system 710, such as during start-up, may be stored in ROM 731. RAM 732 may contain data and/or program modules that are immediately accessible to and/or presently being operated on by the processors 720. System memory 730 may additionally include, for example, operating system 734, application programs 735, other program modules 736 and program data 737.

The computer system 710 also includes a disk controller 740 coupled to the bus 721 to control one or more storage devices for storing information and instructions, such as a magnetic hard disk 741 and a removable media drive 742 (e.g., floppy disk drive, compact disc drive, tape drive, and/or solid state drive). The storage devices may be added to the computer system 710 using an appropriate device interface (e.g., a small computer system interface (SCSI), integrated device electronics (IDE), Universal Serial Bus (USB), or FireWire).

The computer system 710 may also include a display controller 765 coupled to the bus 721 to control a display or monitor 765, such as a cathode ray tube (CRT) or liquid crystal display (LCD), for displaying information to a computer user. The computer system includes an input interface 760 and one or more input devices, such as a keyboard 762 and a pointing device 761, for interacting with a computer user and providing information to the processor 720. The pointing device 761, for example, may be a mouse, a trackball, or a pointing stick for communicating direction information and command selections to the processor 720 and for controlling cursor movement on the display 766. The display 766 may provide a touch screen interface which allows input to supplement or replace the communication of direction information and command selections by the pointing device 761.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium, such as a hard disk 741 or a removable media drive 742. The hard disk 741 may contain one or more datastores and data files used by embodiments of the present invention. Datastore contents and data files may be encrypted to improve security. The processors 720 may also be employed in a multi-processing arrangement to execute the one or more sequences of instructions contained in system memory 730. In alternative embodiments, hard-wired circuitry may be used in place of or in combination with software instructions. Thus, embodiments are not limited to any specific combination of hardware circuitry and software.

As stated above, the computer system 710 may include at least one computer readable medium or memory for holding instructions programmed according embodiments of the invention and for containing data structures, tables, records, or other data described herein. The term "computer readable medium" as used herein refers to any medium that participates in providing instructions to the processor 720 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 741 or removable media drive 742. Non-limiting examples of volatile media include dynamic memory, such as system memory 730. Non-limiting examples of transmission media include coaxial cables, copper wire, and fiber optics, including the wires that make up the bus 721. Transmission media may also take the form of acoustic or light waves, such as those generated during radio wave and infrared data communications.

The computing environment 700 may further include the computer system 720 operating in a networked environment using logical connections to one or more remote computers, such as remote computer 780. Remote computer 780 may be a personal computer (laptop or desktop), a mobile device, a server, a router, a network PC, a peer device or other common network node, and typically includes many or all of the elements described above relative to computer 710. When used in a networking environment, computer 710 may include modem 772 for establishing communications over a network 771, such as the Internet. Modem 772 may be connected to system bus 721 via user network interface 770, or via another appropriate mechanism.

Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers (e.g., remote computing system 780). The network 771 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 771.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method of determining an interatrial septum ring in a cardiac image, the method comprising:
    determining, by a computer, a left atrium mean shape based on a plurality of training images;
    determining, by the computer, an interatrial septum ring mean shape based on the left atrium mean shape;
    identifying, by the computer, a left atrium mesh in a new image;
    calculating, by the computer, a deformation field from the left atrium mean shape to the left atrium mesh; and
    applying, by the computer, the deformation field to the interatrial septum ring mean shape to determine the interatrial septum ring in the new image.

2. The method of claim 1, wherein the determining the left atrium mean shape based on the plurality of training images comprises:
    identifying a first left atrium shape in a first training image included in the plurality of training images;
    identifying a plurality of second left atrium shapes in a plurality of second training images included in the plurality of training images;
    applying a geometric transformation to each of the plurality of second left atrium shapes to align each second left atrium shape with the first left atrium shape; and
    determining the mean left atrium shape based on the first left atrium shape and the plurality of aligned second left atrium shapes.

3. The method of claim 2, wherein the determining the mean left atrium shape based on the first left atrium shape and the plurality of aligned second left atrium shapes comprises:
    identifying a plurality of first points corresponding to the first left atrium shape;
    identifying a plurality of second points corresponding to the second left atrium shape; and
    calculating an average based on the plurality of first points and the plurality of second points to determine the mean left atrium shape.

4. The method of claim 1, wherein the determining the interatrial septum ring mean shape based on the left atrium mean shape comprises:
    for each training image included in the plurality of training images,
        identifying a left atrium shape and an interatrial septum ring shape in a respective training image,
        determining a similarity transformation between the identified left atrium shape and the left atrium mean shape, and
        applying the similarity transformation to the identified interatrial septum ring shape to create a warped interatrial septum ring shape;
    identifying a plurality of points corresponding to the warped interatrial septum ring shapes; and
    determining the interatrial septum ring mean shape based on an averaging of the plurality of points.

5. The method of claim 1, wherein the deformation field is calculated using a thin plate spline model.

6. The method of claim 1, further comprising:
    identifying a plurality of neighboring points on the left atrium mesh corresponding to a predicted location of a interatrial septum ring,
    wherein deformation field from the left atrium mean shape to the left atrium mesh is calculated based on the plurality of neighboring points.

7. The method of claim 1, further comprising:
identifying a plurality of points corresponding to the determined interatrial septum ring;
determining a projected position for each of the plurality of points; and
adjusting each of the plurality of points by its corresponding projected position.

8. The method of claim 7, wherein the projected position of a respective point corresponds to a position on the left atrium mesh that is closest in distance from the respective point.

9. The method of claim 1, further comprising:
presenting a representation of the determined interatrial septum ring and the new image.

10. A method of determining an interatrial septum ring in a cardiac image, the method comprising:
receiving, by a computer, an indication of whether a boundary associated with an interatrial septum wall is visible in an image;
if the boundary associated with an interatrial septum wall is visible in an image, performing a first procedure comprising:
determining, by the computer, an initial estimate of the interatrial septum wall included in the image,
applying, by the computer, a discriminative shape model to the initial estimate of the interatrial septum wall to determine the interatrial septum ring in the image; and
if the boundary associated with an interatrial septum wall is not visible in an image, performing a second procedure comprising:
determining, by the computer, a left atrium mean shape based on a plurality of training images,
determining, by the computer, an interatrial septum ring mean shape based on the left atrium mean shape,
identifying, by the computer, a left atrium mesh in the image,
calculating, by the computer, a deformation field from the left atrium mean shape to the left atrium mesh, and
applying, by the computer, the deformation field to the interatrial septum ring mean shape to determine the interatrial septum ring in the image.

11. The method of claim 10, wherein the determining the initial estimate of the interatrial septum wall included in the image comprises:
determining, by the computer, a first atrium segment and a second atrium segment based on the image;
identifying, by the computer, a surface patch of the first atrium segment based on the proximity of the surface patch to the second atrium segment; and
determining, by the computer, the initial estimate of the interatrial septum wall based on the surface patch.

12. The method of claim 10, wherein the initial estimate of the interatrial septum wall is determined using marginal space learning.

13. The method of claim 10, wherein the determining the left atrium mean shape based on the plurality of training images comprises:
identifying a first left atrium shape in a first training image included in the plurality of training images;
identifying a plurality of second left atrium shapes in a plurality of second training images included in the plurality of training images;
applying a geometric transformation to each of the plurality of second left atrium shapes to align each second left atrium shape with the first left atrium shape; and
determining the mean left atrium shape based on the first left atrium shape and the plurality of aligned second left atrium shapes.

14. The method of claim 10, wherein the determining the mean left atrium shape based on the first left atrium shape and the plurality of aligned second left atrium shapes comprises:
identifying a plurality of first points corresponding to the first left atrium shape;
identifying a plurality of second points corresponding to the second left atrium shape; and
calculating an average of the plurality of first points and the plurality of second points to determine the mean left atrium shape.

15. The method of claim 10, wherein the determining the interatrial septum ring mean shape based on the left atrium mean shape comprises:
for each training image included in the plurality of training images,
identifying a left atrium shape and an interatrial septum ring shape in a respective training image,
determining a similarity transformation between the identified left atrium shape and the left atrium mean shape, and
applying the similarity transformation to the identified interatrial septum ring shape to create a warped interatrial septum ring shape; and
identifying a plurality of points corresponding to the warped interatrial septum ring shapes; and
determining the interatrial septum ring mean shape based on an averaging of the plurality of points.

16. The method of claim 10, wherein the method further comprises:
identifying a plurality of neighboring points on the left atrium mesh corresponding to a predicted location of a interatrial septum ring,
wherein deformation field from the left atrium mean shape to the left atrium mesh is calculated based on the plurality of neighboring points.

17. The method of claim 10, wherein the method further comprises:
identifying a plurality of points corresponding to the determined interatrial septum ring;
determining a projected position for each of the plurality of points; and
adjusting each of the plurality of points by its corresponding projected position.

18. The method of claim 17, wherein the projected position of a respective point corresponds to a position on the left atrium mesh that is closest in distance from the respective point.

19. The method of claim 10, wherein an indication of whether a boundary associated with an interatrial septum wall is visible in an image is received from medical personnel during a surgical procedure.

20. A system for determining an interatrial septum ring in a cardiac image, the system comprising:
a database configured to store a plurality of training images;
a receiver operably coupled to an imaging device and configured to receive a new image from the imaging device; and
a processor configured to:
determine a left atrium mean shape based on the plurality of training images,
determine an interatrial septum ring mean shape based on the left atrium mean shape,
identify a left atrium mesh in the new image,
calculate a deformation field from the left atrium mean shape to the left atrium mesh, and apply the deformation field to the interatrial septum ring mean shape to determine the location of the interatrial septum ring in the new image.

21. The system of claim 20, further comprising:
a display configured to present a representation of the determined interatrial septum ring and the new image.

\* \* \* \* \*